United States Patent
Sasaki

(10) Patent No.: US 7,805,410 B2
(45) Date of Patent: Sep. 28, 2010

(54) LOAD ESTIMATING SYSTEM AND COMPUTER LOAD ESTIMATING METHOD

(75) Inventor: Shigero Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 392 days.

(21) Appl. No.: 12/042,844

(22) Filed: Mar. 5, 2008

(65) Prior Publication Data

US 2008/0222090 A1    Sep. 11, 2008

(30) Foreign Application Priority Data

Mar. 8, 2007    (JP) .............................. 2007-059055

(51) Int. Cl.
G06F 17/30    (2006.01)
(52) U.S. Cl. ...................... 707/674; 707/802
(58) Field of Classification Search ................ 707/674, 707/802

See application file for complete search history.

(56) References Cited

U.S. PATENT DOCUMENTS 6,925,421 B2 *  8/2005  de Souza et al. ............ 702/186

2002/0165900 A1 * 11/2002 Kubo et al. .................. 709/105

FOREIGN PATENT DOCUMENTS

JP          09097200 A      4/1997

OTHER PUBLICATIONS

Valarie Moore et al., "Oracle Database Tuning Guide", 10g Release 1 (10.1), Part No. B12449-01, pub. 2004, pages 1-54, Oracle Corporation.

* cited by examiner

Primary Examiner—Cheryl Lewis

(57) ABSTRACT

A load estimating system which estimates a load of a database, includes a storage unit, a record number calculating module, and an access number calculating module. The storage unit includes structure information defining a structure of a table in said database, first distribution information indicating probability distribution of condition variables of a query for said table, and second distribution information indicating probability distribution of values in said table. The record number calculating module calculates the average number of selected records which meet conditions defined by-condition variables, based on said structure information, said first distribution information and said second distribution information. The access number calculating module calculates the number of block accesses for said query based on the average number of selected records.

16 Claims, 19 Drawing Sheets

Fig. 1

TBL

| COL1: ID | COL2: PRODUCT NAME | COL3: PRICE |
|---|---|---|
| 0 | ~ | 1200 |
| 1 | ~ | 750 |
| 2 | ~ | 420 |
| ... | ... | ... |
| 3123 | ~ | 550 |
| ... | ... | ... |
| 9998 | ~ | 880 |
| 9999 | ~ | 2500 |

Query : [ACCESS TYPE] [TARGET] from [SCOPE] where [CONDITION]
(EXAMPLE)  select       *       from   TBL      where  COL3 between 500 and 1000
                                                              ↑              ↑
                                                         CONDITION VARIABLE

Fig. 9

BLOCK ACCESS NUMBER INFORMATION D10

| EXECUTION PLAN | BLOCK ACCESS NUMBER |
|---|---|
| FULL SCAN | 400 |
| INDEX SCAN | 7 |
| KEY SCAN | N/A |
| OPTIMAL EXECUTION PLAN = INDEX SCAN ||

Fig. 12

BLOCK ACCESS NUMBER INFORMATION D10

| EXECUTION PLAN | BLOCK ACCESS NUMBER |
|---|---|
| FULL SCAN | 400 |
| INDEX SCAN | 6 |
| KEY SCAN | N/A |
| OPTIMAL EXECUTION PLAN = INDEX SCAN ||

Fig. 14

BLOCK ACCESS NUMBER INFORMATION D10

| EXECUTION PLAN | BLOCK ACCESS NUMBER |
|---|---|
| FULL SCAN | 400 |
| INDEX SCAN | 3.016 |
| KEY SCAN | N/A |
| OPTIMAL EXECUTION PLAN = INDEX SCAN ||

Fig. 15

BLOCK ACCESS NUMBER INFORMATION D10

| EXECUTION PLAN | BLOCK ACCESS NUMBER |
|---|---|
| FULL SCAN | 400 |
| INDEX SCAN | Random:7/Sequential:3.016 |
| KEY SCAN | N/A |
| OPTIMAL EXECUTION PLAN = INDEX SCAN ||

Fig. 17

LOAD INFORMATION D8

- COMPUTER LOAD FOR ONE BLOCK ACCESS = CPU TIME 0.001ms
- COMPUTER LOAD FOR OTHER PROCESSES = CPU TIME 0.1ms

Fig. 19

PERFORMANCE INDEX INFORMATION D20

| EXECUTION PLAN | BLOCK ACCESS NUMBER | CPU TIME (ms) | THROUGHPUT (tps) |
|---|---|---|---|
| FULL SCAN | 400 | 0.5 | 2000 |
| INDEX SCAN | 7 | 0.107 | 9345 |
| KEY SCAN | N/A | N/A | N/A |

OPTIMAL EXECUTION PLAN = INDEX SCAN

LOAD ESTIMATING SYSTEM AND COMPUTER LOAD ESTIMATING METHOD

This application is based upon and claims the benefit of priority from Japanese patent application No. 2007-59055 filed on Mar. 8, 2007, the disclosure of which is incorporated herein in its entirety by reference.

TECHNICAL FIELD

The present invention relates to a technique for estimating a load of a computer system that includes a database.

BACKGROUND ART

A database management system (DBMS) is computer software designed for the purpose of managing a database. A DBMS processes queries which represent requests for information. One of the popular DBMS is a relational DBMS (RDBMS) and queries to an RDBMS are described in SQL (Structured Query Language) (refer to "Oracle Database Performance Tuning Guide", 10 g Release 1 (10.1), Part Number: B12449-01).

A table in an RDBMS includes a plurality of records. A record is composed of columns. TBL in FIG. 1 is a table including 10,000 records. Each record includes three columns, "ID", "PRODUCT NAME", and "PRICE".

A query includes an "access type" indicating how to manipulate records, a "target" indicating which columns of a record should be manipulated, a "scope" indicating which part of data, or which table, records are included in, and a "condition" indicating conditions which selected records must satisfy. Then, "target" in selected record are manipulated according to "access type". The "access type" is "select (data reading)", "update (data update)", "insert (record insertion)", or "delete (record deletion)" in SQL. The query in FIG. 1 specifies "read all columns of records whose value of price is between 500 and 1000 (a target "*" implies all columns) from the table TBL". This query reads three records which satisfies a condition.

A table is stored into blocks. A block is a sequence of bytes or bits having nominal length (block size), and can store records according to a block size and record sizes. We call blocks storing a table "table blocks".

Metadata, typically a tree index, is often added to a column of a table in order to find records whose value of the column satisfies given conditions without checking all records in a table. A tree index includes "entries" which are composed of a key value and a pointer. One entry corresponds to one record. A key value is a value of a column of a corresponding record. A pointer shows which table block the corresponding record is stored. Entries are also stored into blocks, which we call leaf blocks, and are sorted by key value. A tree index also includes "branches". A branch includes pointers to leaf blocks and ranges of key values of entries in the leaf blocks. We call a block storing branches a "branch block". A branch can include a pointer to a branch block and a range of key values in branch blocks. Then, we can find records which a query manipulates by following pointers in a tree index.

As shown in FIG. 2, the leaf block has a plurality of entries, and each entry is composed of a key value and a pointer. In this example, the key value is "PRICE". In each leaf block, the plurality of entries is sorted by key value.

When the metadata can be used, the DBMS refers to the metadata and consequently accesses the table block. That is, the DBMS refers to the metadata and obtains pointers P3, P4 and P5 correlated to the key values of selected records and then accesses the addresses indicated by the pointers P3, P4 and P5. In this case, the DBMS is required to access a total of five blocks (the branch block, the leaf block and the table blocks BL-i, BL-j and BL-k).

As mentioned above, the DBMS accesses the necessary blocks which store data which need accessed for processing a query. Hereafter, an access to a block is referred to as a block access. Also, hereafter, the number of the block accesses necessary for a query process is referred to as a block access number. Also, hereafter, the data reading from the block necessary for the query process is referred to as a fetch.

A load by fetching greatly depends on the block access number, namely, the content of the query. For example, when the query manipulates a large number of records, many blocks must be accessed, which increases the load by fetching. A Load by fetching has a considerable influence on the processing performance of the computer system. Therefore, it is important to conserve a load by fetching, namely, the block access number to a suitable value.

As the typical technique related to the database management system (DBMS), the followings are known.

Japanese Laid-Open Patent Application JP-A-Heisei, 9-97200 discloses a database system of a client-server architecture. A server has a log file for processing histories of queries. The server refers to the log file when the server receives a query from a client. Then, the server estimates a load of the query from processing histories of a similar query and sends the estimation to the client. The client determines whether the query should be really executed based on the estimation or not.

We have now discovered that it is important to conserve a load by fetching, namely, the block access number to the suitable value from the viewpoint of the processing performance of the computer system as mentioned above. Thus, the technique that can estimate the block access number (the number of block accesses) is desired.

SUMMARY

An exemplary object of the present invention is to provide a load estimating system, a computer load estimating method and a computer program product thereof that can estimate the load the computer system including the database.

In order to achieve an exemplary aspect of the present invention, the present invention provides a load estimating system which estimates a load of a database, including: a storage unit configured to include structure information defining a structure of a table in the database, first distribution information indicating probability distribution of condition variables of a query for the table, and second distribution information indicating probability distribution of values in the table; a record number calculating module configured to calculate the average number of selected records which meet conditions defined by condition variables, based on the structure information, the first distribution information and the second distribution information; and an access number calculating module configured to calculate the number of block accesses with respect to the query based on the number of selected records.

In order to achieve another exemplary aspect of the present invention, the present invention provides a method of estimating a computer load, which estimates a load of a database, including: reading structure information defining a structure of a table in the database from a storage unit; reading first distribution information indicating probability distribution of condition variables of a query for the table from the storage unit; reading second distribution information indicating probability distribution of values in the table from the storage unit; calculating the average number of selected records, based on the structure information, the first distribution information and the second distribution information; and calculating the number of block accesses with respect to the query based on the number of selected records.

In order to achieve still another exemplary aspect of the present invention, the present invention provides a computer program product for a method of estimating a computer load, which estimates a load of a database, embodied on a computer-readable medium and comprising code that, when executed, causes a computer to perform the following: reading structure information defining a structure of a table in the database from a storage unit; reading first distribution information indicating probability distribution of condition variables of a query for the table from the storage unit; reading second distribution information indicating probability distribution of values in the table from the storage unit; calculating the average number of selected records, based on the structure information, the first distribution information and the second distribution information; and calculating the number of block accesses with respect to the query based on the number of selected records.

BRIEF DESCRIPTION OF THE DRAWINGS

The above and other objects, advantages and features of the present invention will be more apparent from the following description of certain preferred exemplary embodiments taken in conjunction with the accompanying drawings, in which:

FIG. 1 is a conceptual view explaining a typical query process;

FIG. 9 is a table showing a block access number information obtained in the first processing example;

FIG. 12 is a table showing a block access number information obtained in the second processing example;

FIG. 14 is a table showing a block access number information obtained in the third processing example;

FIG. 15 is a table showing a block access number information obtained in a fourth processing example;

FIG. 17 is a view showing load information;

FIG. 19 is a table showing a performance table information; and

EXEMPLARY EMBODIMENTS

The invention will be now described herein with reference to illustrative exemplary embodiments. Those skilled in the art will recognize that many alternative embodiments can be accomplished using the teachings of the present invention and that the invention is not limited to the exemplary embodiments illustrated for explanatory purposed.

1. First Exemplary Embodiment 1-1. Configuration

Figure 2:
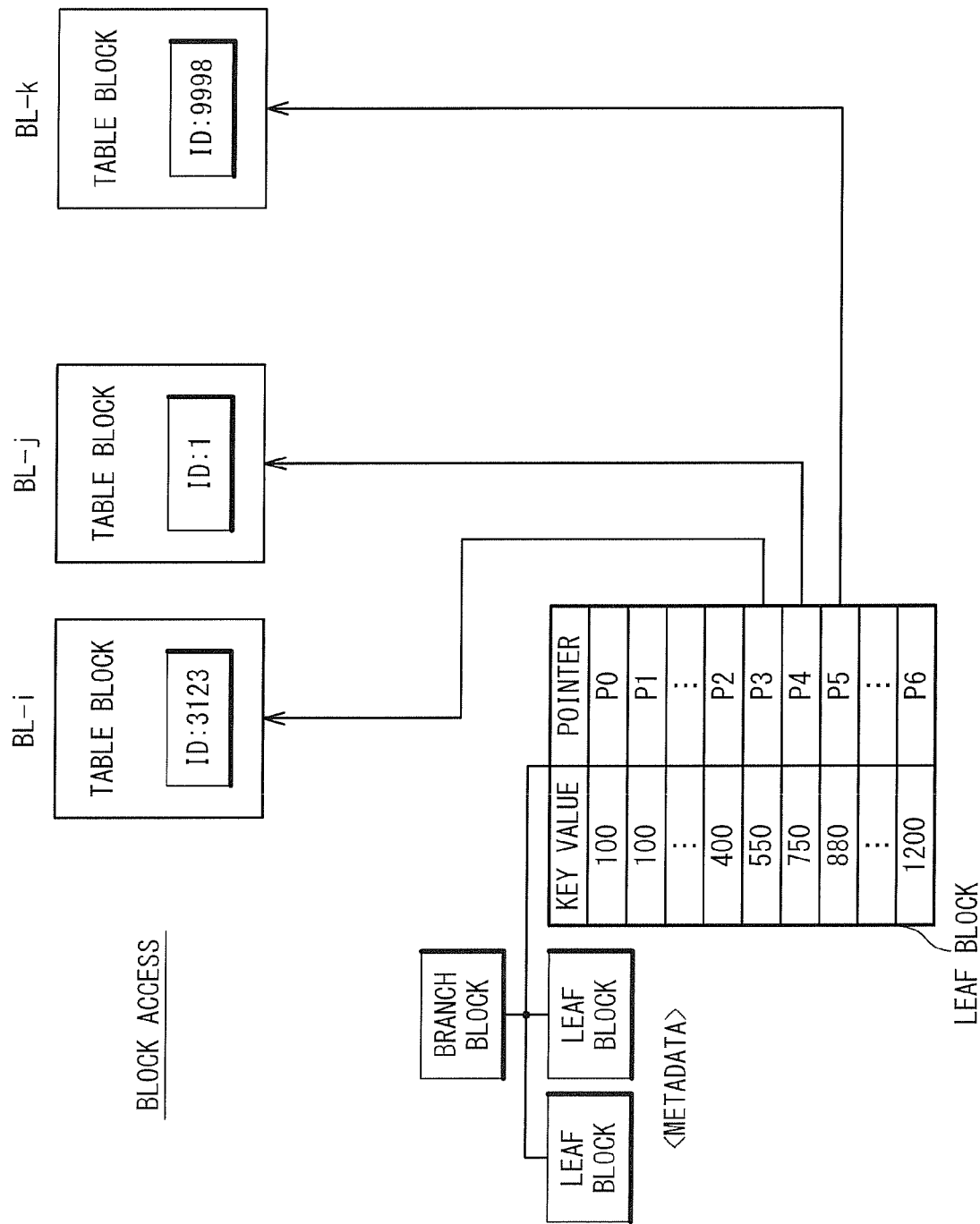
FIG. 2 is a conceptual view explaining a typical block access.
Figure 3:
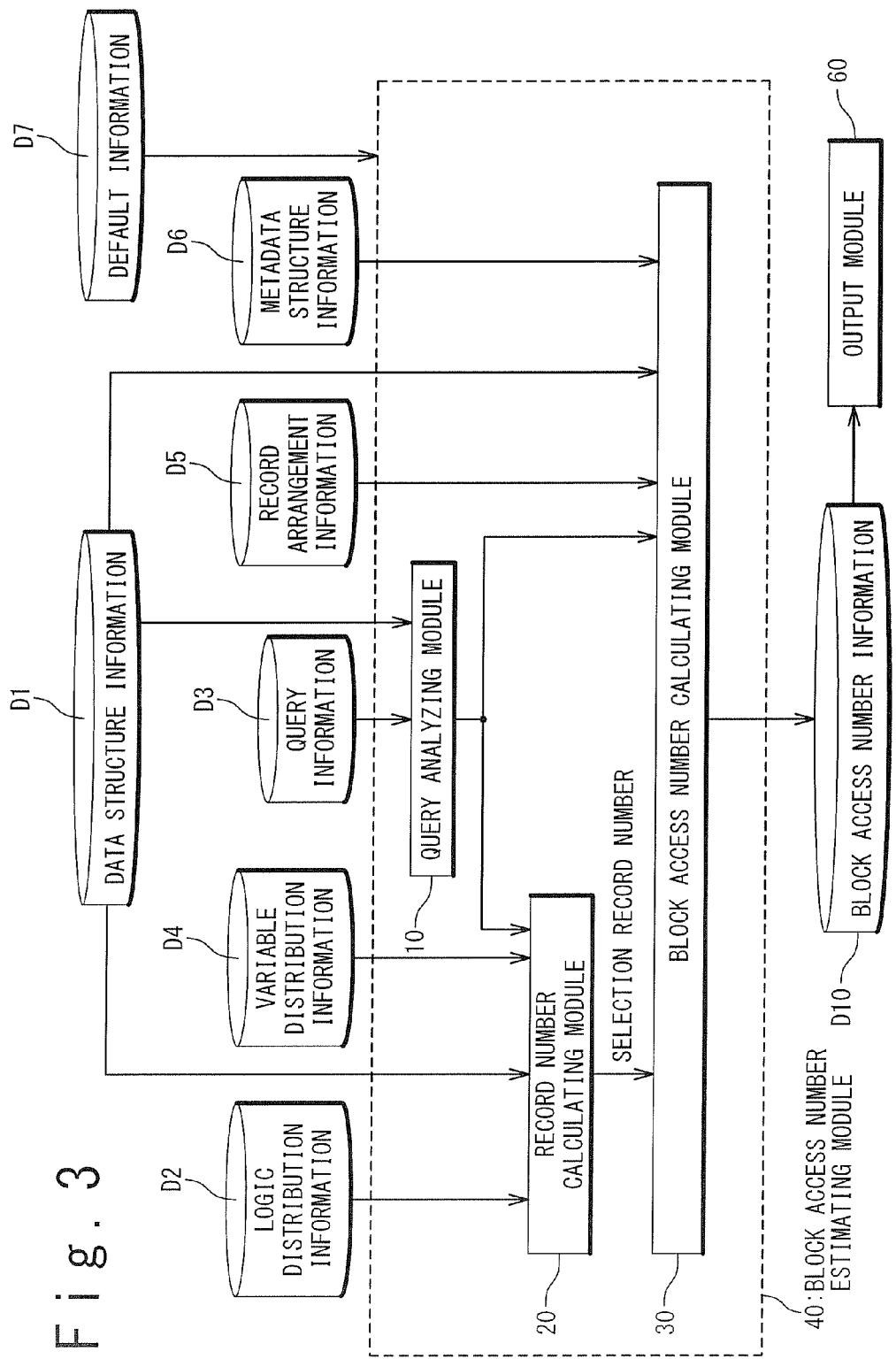
FIG. 3 is a block diagram showing a configuration of a load estimating system according to a first exemplary embodiment of the present invention.

FIG. 3 is a block diagram showing a configuration of a load estimating system according to the first exemplary embodiment of the present invention. The load estimating system according to this exemplary embodiment includes a block access number estimating module 40 and an output module 60. The block access number estimating module 40 includes a query analyzing module 10, a record number calculating module 20 and a block access number calculating module 30. Data structure information D1, logic distribution information D2, query information D3, variable distribution information D4, record arrangement information D5 and metadata structure information D6 are inputted as the input information to the block access number estimating module 40. Also, depending on a case, default information D7 is inputted to the block access number estimating module 40. Those input information will be described below in detail.

Figure 4:
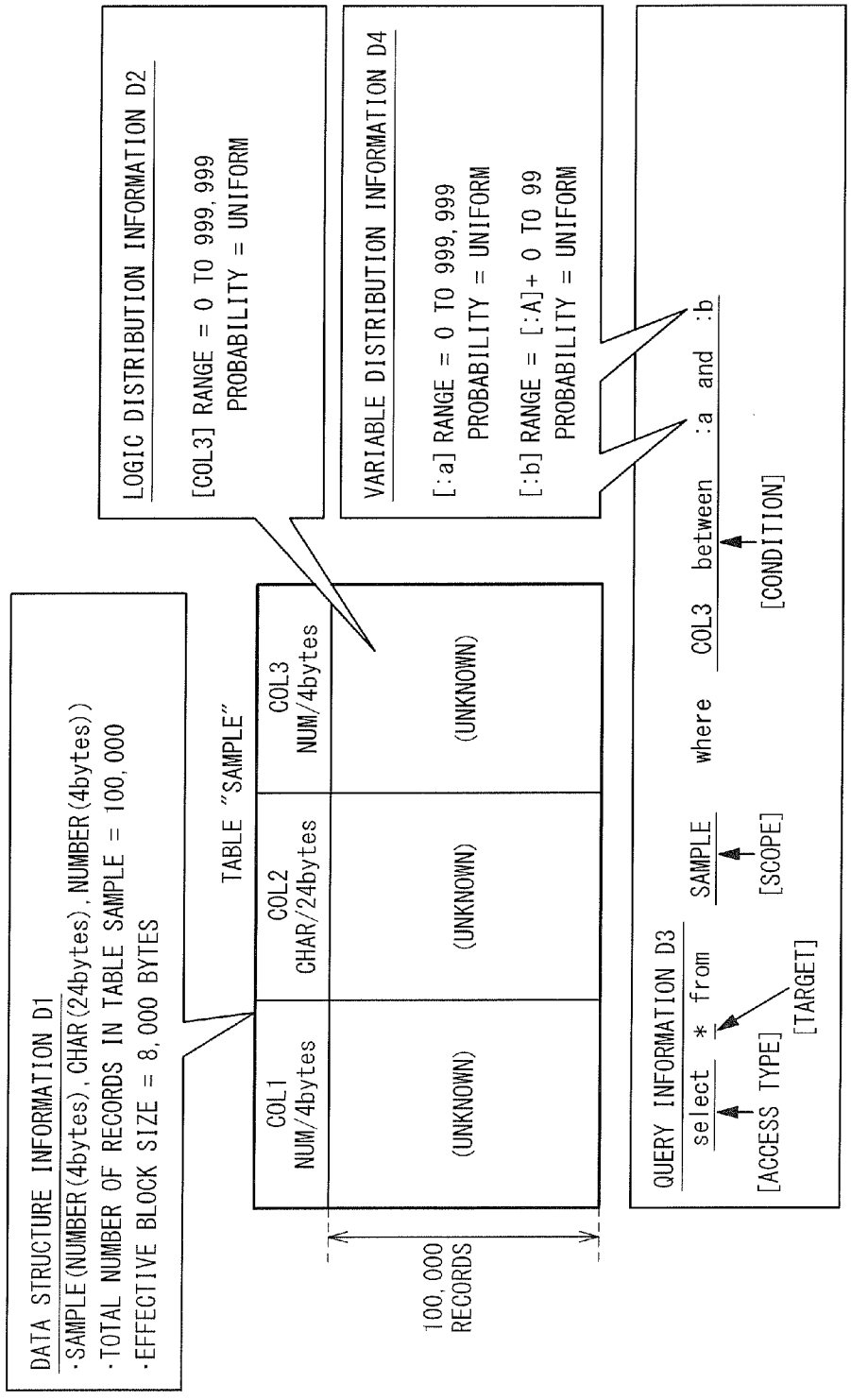
FIG. 4 is a conceptual view explaining a first processing example.

FIG. 4 shows a table SAMPLE and example of a query for the table SAMPLE. In this exemplary embodiment, the respective values of the table SAMPLE may be undetermined, and they are not required. However, the type and structure of the table SAMPLE can be defined before building the computer system. The definition is represented by the data structure information D1.

The data structure information D1 indicates the type and structure of the table SAMPLE and the total number of the records. For example, in FIG. 4, the data structure information D1 indicates that (1) the table SAMPLE exists in the database, (2) each record of the table SAMPLE is composed of a 4-byte number column COL1, a 24-byte character string column COL2, and a 4-byte number column COL3, and (3) the total number of the records in the table SAMPLE is 100,000. Moreover, the data structure information D1 indicates (4) the size (effective block size) per table block in a storage region where the database is actually stored. In the example shown in FIG. 4, the effective block size is 8,000 bytes. In this way, the data structure information D1 defines the structure related to the database and the table.

As mentioned above, the respective values of the table SAMPLE may be undetermined. However, the distribution of values in the table SAMPLE can be defined in advance. The definition is represented by the logic distribution information D2. For example, in FIG. 4, the logic distribution information D2 indicates that the values of the third column COL3 ranges from 0 to 999,999 with a uniform probability.

The query information D3 indicates a given query for the table SAMPLE. The query is described in SQL and includes the "access type", "target", "scope" and "condition". For example, in FIG. 4, the query information D3 indicates a query of "select * from SAMPLE where COL3 between :a and :b". The symbol * implies all of the columns COL1 to COL3, namely, the records. Thus, this query specifies that the records in which the value of the third column COL3 is in the range of a to b are read from the table SAMPLE. One object of the present invention is to estimate the number of block accesses (the block access number) that is caused by such a query.

Hereafter, each of the variables a, b in the condition of the query is referred to as a "condition variable". We can define the distribution of the condition variables a, b, in advance. The definition is represented by the variable distribution information D4. Specifically, the variable distribution information D4 statistically indicates the values that condition variables a, b can hold. This indicates the probability distribution of the condition variables a, b. For example, in FIG. 4, the variable distribution information D4 indicates that (1) the condition variable a ranges from 0 to 999,999 with the uniform probability and (2) the condition variable b ranges from (a+0) to (a+99) with the uniform probability. Incidentally, the condition variable may be discrete.

Figure 5:
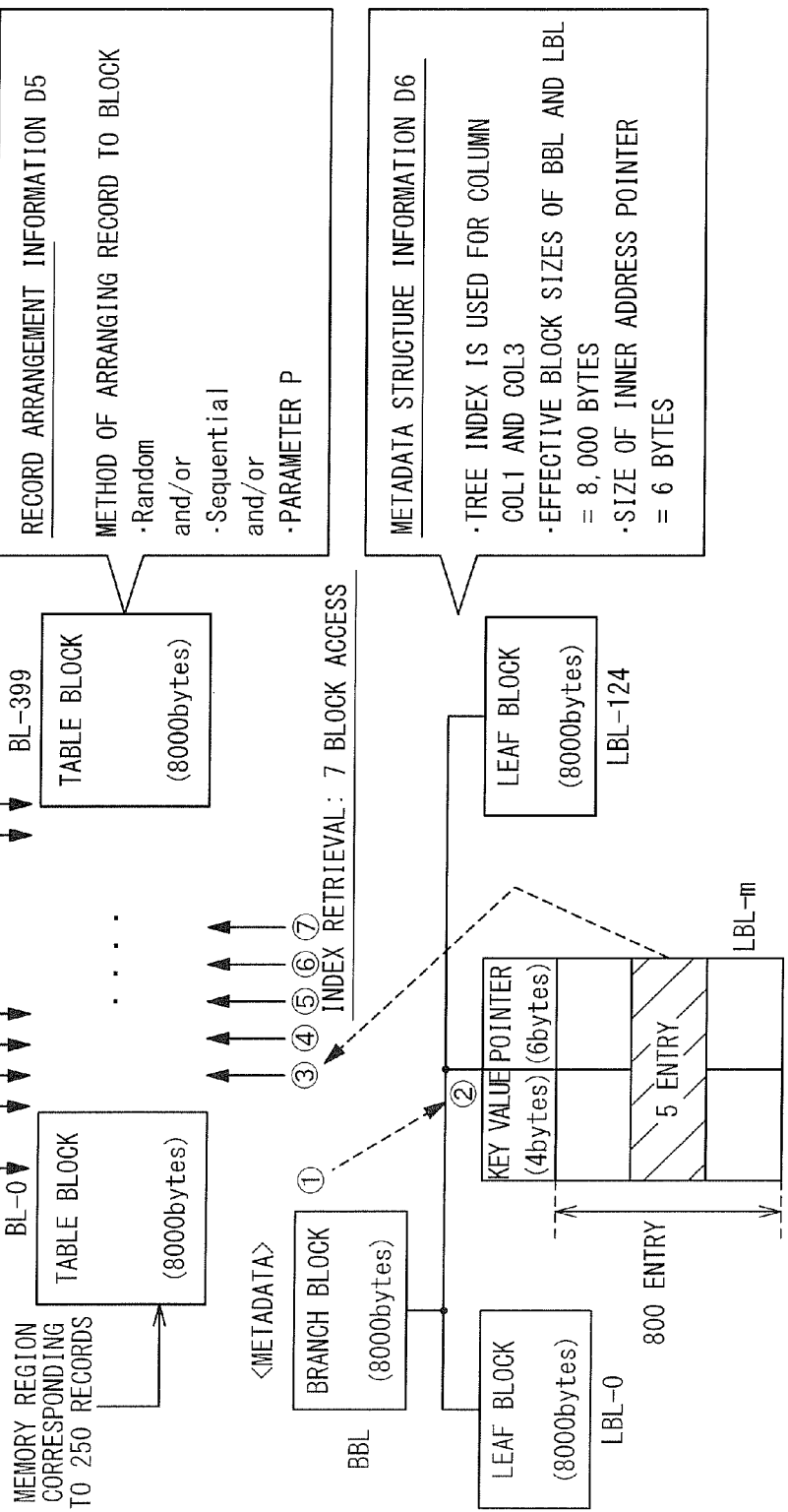
FIG. 5 is a conceptual view explaining the first processing example.

FIG. 5 conceptually shows a block configuration in the storage region where the database is actually stored. The block is a physical storage region having a predetermined size. At the time of the block access, data included in the block are collectively read (fetched). The data of the table SAMPLE are stored in a plurality of table blocks BL. The effective block size (for example, 8,000 bytes) of each table block BL is defined in the data structure information D1.

The record arrangement information D5 indicates how the records of the table SAMPLE are arranged in the table block BL. In short, the record arrangement information D5 indicates the method of arranging the records into the table blocks BL. For example, the record arrangement information D5 indicates a "Random" arrangement that the respective records of the table SAMPLE are randomly arranged independently of the values of the third column COL3. And/or, the record arrangement information D5 may indicate a "Sequential" arrangement that the respective records of the table SAMPLE are arranged sequentially in the value order of the third column COL3. And/or, the record arrangement information D5 may indicate a parameter P that represents the degree of the "Random" arrangement or the degree of the "Sequential" arrangement.

Also, metadata may be used in the database. The metadata is an index of the data stored in the table blocks BL and has a tree-shaped hierarchy structure as shown in FIG. 5. Such an index may be referred to as a tree index. The index in the lowest hierarchy in the tree index is stored in a leaf block LBL. Each leaf block LBL has a plurality of entries, and each entry is composed of a "key value" and "inner address pointer". The inner address pointer points out the head address of the record in which the key value is stored. In each leaf block LBL, the plurality of entries is sorted by key value. Also, the index of the higher hierarchy of the tree index is the index of the leaf blocks LBL and stored in a branch block BBL.

The metadata structure information D6 defines a type and structure of the metadata. Similarly to the data structure information D1, in this exemplary embodiment, the respective values of the metadata may be undetermined, and they are not required. For example, in FIG. 5, the metadata structure information D6 indicates that (1) the tree index is used for the first column COL1 and the third column COL3, (2) the effective block sizes of the branch block BBL and the leaf block LBL are 8,000 bytes, and (3) the size of the inner address pointer is 6 bytes.

The default information D7 indicates the default settings of the logic distribution information D2, the variable distribution information D4 and the record arrangement information D5. When any of the logic distribution information D2, the variable distribution information D4 and the record arrangement information D5 is not given, the default information D7 is used as input information.

The foregoing input information D1 to D7 are obtained from, for example, the design specifications and/or information measured in the computer system under the operation. Then, the input information D1 to D7 is stored in a predetermined storage unit.

Again, with reference to FIG. 3, the block access number estimating module 40 reads the input information D1 to D7 from the predetermined storage unit. The block access number estimating module 40 estimates the block access number (the number of block accesses) by using the input information D1 to D7. Then, the block access number estimating module 40 calculates block access number information D10 indicating its estimated value. The output module 60 outputs the calculated block access number information D10 to the output apparatus, such as a display, a printer and the like.

The processes executed by the respective modules will be described below in further detail.

1-2. First Processing Example

Figure 6:
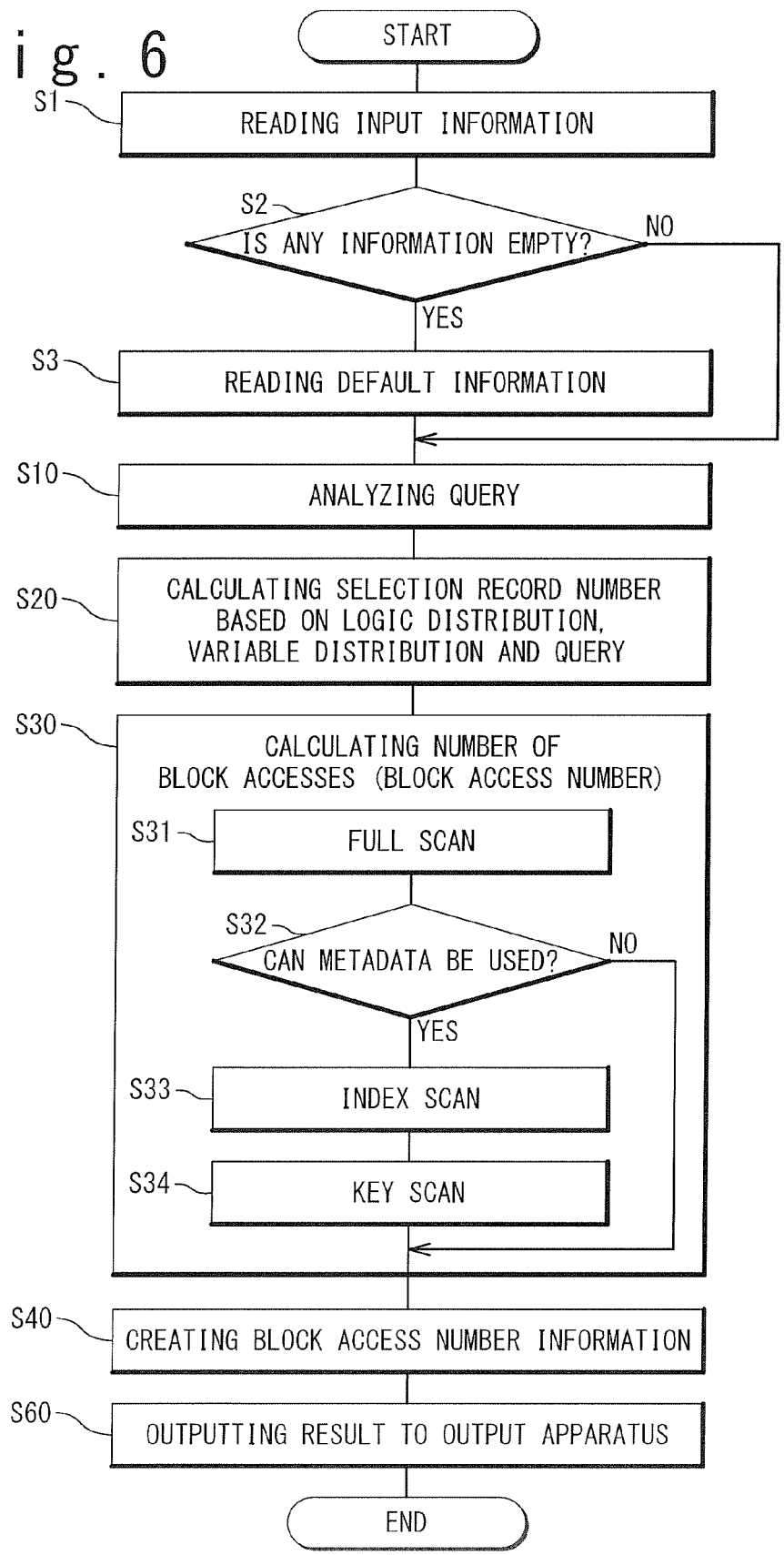
FIG. 6 is a flowchart showing a computer load estimating method according to the first exemplary embodiment.

FIG. 6 is a flowchart showing the process executed by the load estimating system according to this exemplary embodiment. An example of the process is explained along the flow shown in FIG. 6. The record arrangement information D5 is assumed to indicate the "Random" arrangement.

Steps S1 to S3: Reading of Input Information

At first, the block access number estimating module 40 reads the input information D1 to D6 from the storage unit (Step S1). Then, if any of the logic distribution information D2, the variable distribution information D4 and the record arrangement information D5 is empty (Step S2; Yes), the default information D7 is read (Step S3). In this example, all input information is given and goes to a step S10.

Step S10: Query Analyzing Process

Next, the query analyzing module 10 receives the data structure information D1 and the query information D3 (refer to FIG. 3). Then, the query analyzing module 10, while referring to the data structure information D1, analyzes the query indicated by the query information D3 and extracts the "access type", "target", "scope" and "condition" from the query. As shown in FIG. 4, the query in this example is "select * from SAMPLE where COL3 between :a and :b". In this case, the "access type" is Select (Reading). The "scope" is the table SAMPLE defined in the data structure information D1. The "condition" implies that the value of the third column COL3 defined in the data structure information D1 is in the range of the condition variables a to b. The "target" is all columns, namely, the whole record.

Step S20: Calculation of the Number of Selected Records

Next, the record number calculating module 20 receives the data structure information D1, the logic distribution information D2 and the variable distribution information D4 (refer to FIG. 3). The record number calculating module 20 also receives the extracted "access type", "scope" and "condition" from the query analyzing module 10. Then, the record number calculating module 20 statistically estimates the number of the records, based on the received information.

Figure 7:
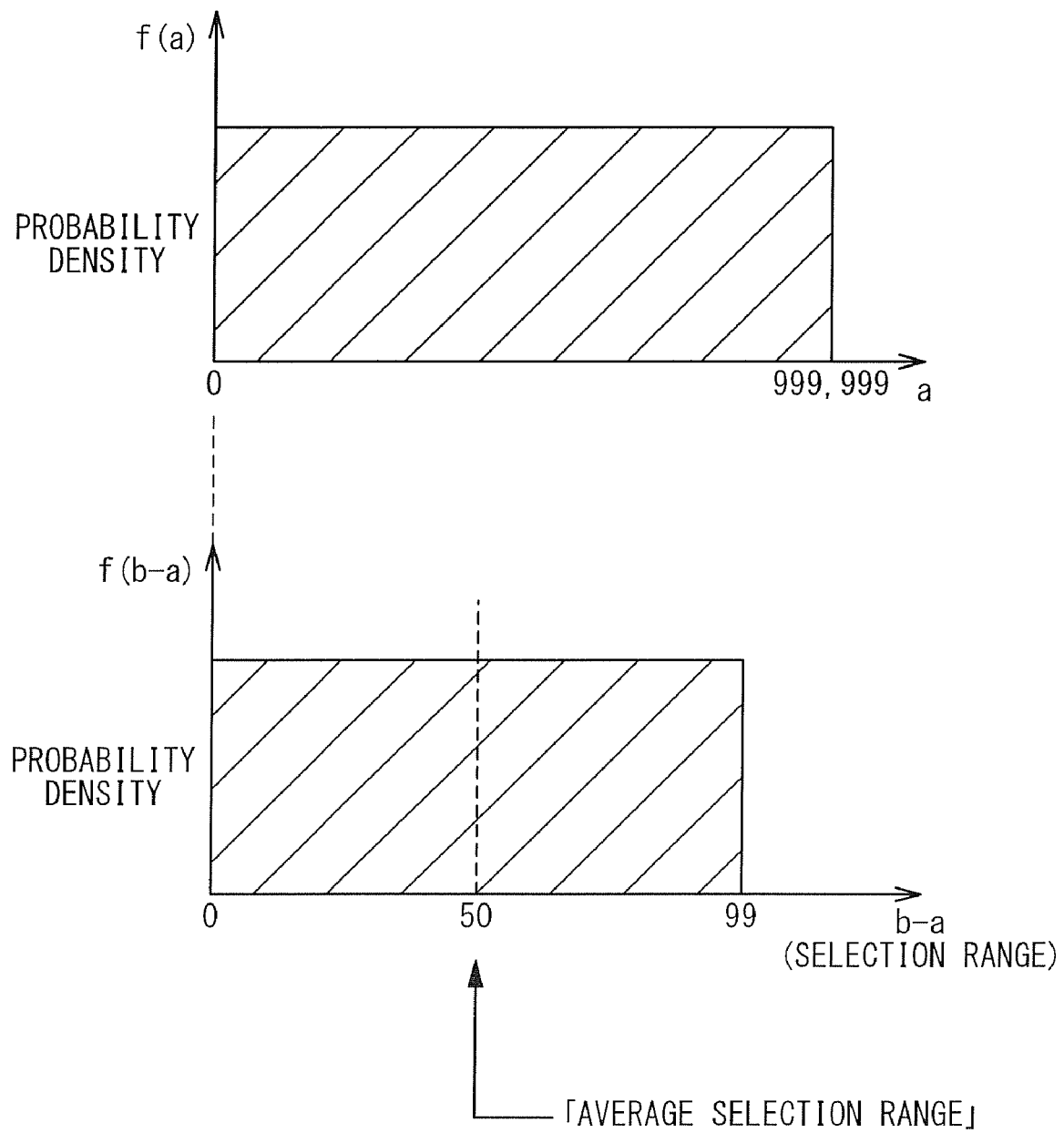
FIG. 7 is a conceptual view explaining a first processing example.

In the example shown in FIG. 4, the variable distribution information D4 indicates that the condition variable a ranges from 0 to 999,999 with the uniform probability. Also, the variable distribution information D4 indicates that a value range (selection range) of (b-a) defined in the condition variables has a value in the range of 0 to 99 with the uniform probability. FIG. 7 shows probability distribution functions of the condition variable a and the value range (b-a). The horizontal axis denotes a value of the condition variable a or the value range (selection range) (b-a), and the vertical axis denotes probability densities f(a) or f(b-a). In this example, (b-a) ranges from 0 to 99, and its probability distribution is uniform. Thus, as shown in FIG. 7, the average value of the value range (selection range) (b-a) is "50". Hereafter, the average value "50" is referred to as an "average selection range".

Figure 8:
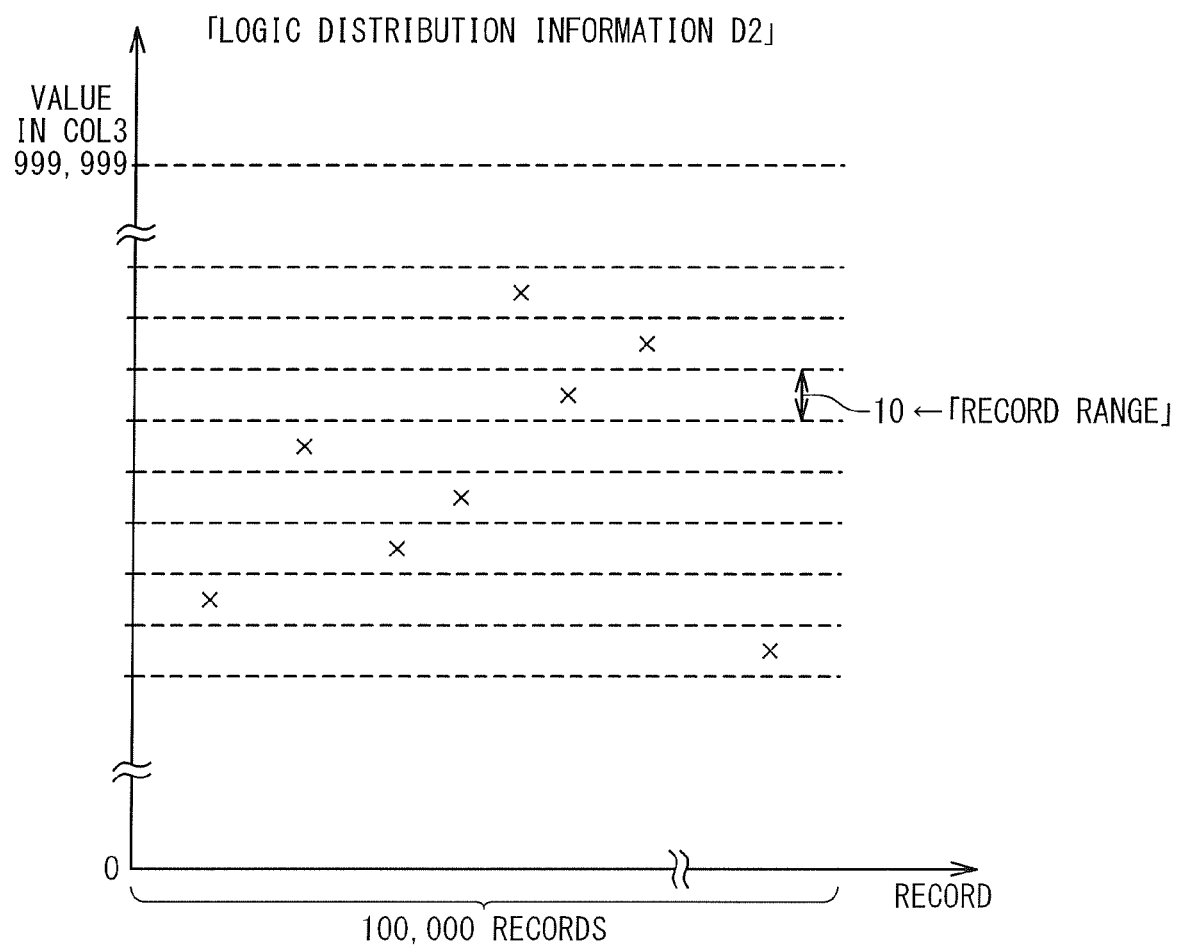
FIG. 8 is a conceptual view explaining the first processing example.

Also, in the example shown in FIG. 4, the logic distribution information D2 denotes that values of the third column COL3 ranges from 0 to 999,999 with the uniform probability. FIG. 8 conceptually shows the distribution of values of the third column COL3. In FIG. 8, the horizontal axis denotes records, and the vertical axis denotes values of their third column COL3. As shown in FIG. 8, the values of the third column COL3 are uniformly distributed in the range between 0 and 999,999. Also, from the data structure information D1, the total number of the records is known to be 100,000. Then, one record is selected on average when the average selection range is 10. Hereafter, the average value "10" is referred to as a "record range".

In this way, under the situation that one record exists for each value range of 10 on average, the record corresponding to the value range of 50 is selected and read. Thus, this is estimated such that the five records are read on average from the table SAMPLE, based on the query in this example. Hereafter, this estimation value "5" is referred to as a "selection record number". The record number calculating module 20 calculates the foregoing average selection range "50" and record range "10" by using the received information. Then, the record number calculating module 20 can calculate the selection record number "5" by dividing the average selection range "50" by the record range "10". The calculated selection record number "5" is the average value of the record numbers satisfying the reading condition, and this is the estimation value of the number of selected records.

Step S30: Calculation of Block Access Number

Next, the block access number calculating module 30 receives the data structure information D1, the record arrangement information D5 and the metadata structure information D6 (refer to FIG. 3). Moreover, the block access number calculating module 30 receives the selection record number from the record number calculating module 20 and receives the "target" and "condition" from the query analyzing module 10. Then, the block access number calculating module 30 calculates the number of block accesses (the block access number) based on the received information. The specific operation will be described below.

At first, from the data structure information D1, each record is composed of the 4-byte number column COL1, the 24-byte character string column COL2 and the 4-byte number column COL3 (refer to FIG. 4). Therefore, the size of one record is 32 bytes. Also, the data structure information D1 indicates that the effective block size of one table block BL is 8,000 bytes. It follows that one table block BL can store 250 records (refer to FIG. 5). The data structure information D1 indicates that the total number of the records in the table SAMPLE is 100,000. Hence, the total number of the table blocks BL required to store all of the records of the table SAMPLE is calculated as "400 (=100,000/250)".

As shown in FIG. 5, it is estimated that all of the records of the table SAMPLE are stored in the 400 table blocks BL-0 to BL-399. The block access number calculating module 30 calculates the number of the table blocks BL to be accessed for the query, among those 400 table blocks. At this time, the block access number calculating module 30 calculates the number of the table blocks BL to be accessed, for each query execution plan. The "execution plan" is the plan indicating how the query is executed. The execution plan implies the searching method for selected records. As the searching method, there are a "full scan", "index scan" and "key scan".

Step S31: Full Scan

When an execution plan is "full scan", all table blocks are accessed and the block access number calculating module 30 estimates the number of block accesses is "400" in this example (refer to FIG. 5).

Step S32:

An index scan is the execution plan which finds selected records by using metadata. The block access number calculating module 30 determines whether a query can be processed by using metadata or not. If the metadata cannot be used (Step S32; No), the step S30 ends. In the case of this example, the metadata structure information D6 is inputted, and the metadata structure information D6 indicates that the tree index is given to the third column COL3 appearing in the "condition". Then, the index scan can be carried out (Step S32; Yes).

Step S33; Index Scan

The method of calculating the block access number when an execution plan is an index scan will be described below with reference to FIG. 5. In the tree index given to the third column COL3, the key value is that in the third column COL3. Because the size of the third column COL3 is 4 bytes is indicated in the data structure information D1 and because the size of the inner address point is 6 bytes is indicated in the metadata structure information D6, the size of one entry in the leaf block LBL or branch block BBL is 10 bytes. Moreover, the metadata structure information D6 indicates that the effective block size of the leaf block LBL or branch block BBL is 8,000 bytes. Thus, each leaf block LBL and the branch block BBL has 800 entries. Moreover, the data structure information D1 indicates that the total number of the records of the table SAMPLE is 100,000. Hence, the 125(=100,000/800) leaf blocks LBL-0 to LBL-124 are required.

One branch block BBL having 800 entries is sufficient for the indexes corresponding to the 125 leaf blocks LBL-0 to LBL-124. Thus, the block access number calculating module 30 estimates the number of the accesses to the branch blocks BBL as "once".

Also, the selection record number in this example is "5". One leaf block LBL has the 800 entries, and the 800 entries are sorted by key value. Thus, the probability is very high that the five entries corresponding to the five records in one leaf block LBL-m. Hence, the block access number calculating module 30 estimates the number of accesses to the leaf blocks LBL as "once".

Also, in this example, the record arrangement information D5 indicates the "random arrangement" in which the respective records are randomly arranged independently of the values of the third column COL3. Thus, the probability is very high that the five records are stored in the five table blocks BL. Hence, the block access number calculating module 30 estimates the number of the accesses to the table blocks BL as "five times".

In this way, seven read accesses are issued to one branch block BBL, one leaf block LBL and five table blocks BL (refer to FIG. 5). That is, the block access number calculating module 30 calculates that seven read accesses are issued.

Step S34: Key Scan

If the metadata can be used and the "target" of the query is the key value itself of the tree index, the key scan can be executed. In the case of the key scan, no access to the table block BL is required, and a query can be processed by accessing only leaf blocks LBL. In this example, since the "target" of the query is all columns, the block access number calculating module 30 determines that the key scan to be impossible. If the "target" is the third column COL3, the block access number becomes "the total of two times".

As mentioned above, the block access number calculating module 30 calculates the block access number for each query execution plan. This block access number corresponds to a load of the computer system. The block access number calculating module 30 may select the optimal execution plan from the viewpoint of the load. In this example, the optimal execution plan is the index scan in which the block access number is 7.

Step S40: Block Access Number Information

In this way, the block access number estimating module 40 estimates the block access number for a query. FIG. 9 shows the block access number information D10 in this example. The block access number information D10 indicates the block access number (the number of block accesses) estimated for each execution plan. Also, the block access number information D10 indicates that the optimal execution plan is an index scan.

Step S60: Output

The output module 60 outputs the block access number information D10 to the output apparatus, such as a display and a printer. The foregoing processing flow is executed for each query. As a result, the block access number information D10 is obtained for many queries.

1-3. Second Processing Example

Another processing example will be described below. In the second processing example, the logic distribution information D2 and the variable distribution information D4 which differ from the first processing example are inputted. The other input information is the same as those in the first processing example.

Figure 10:
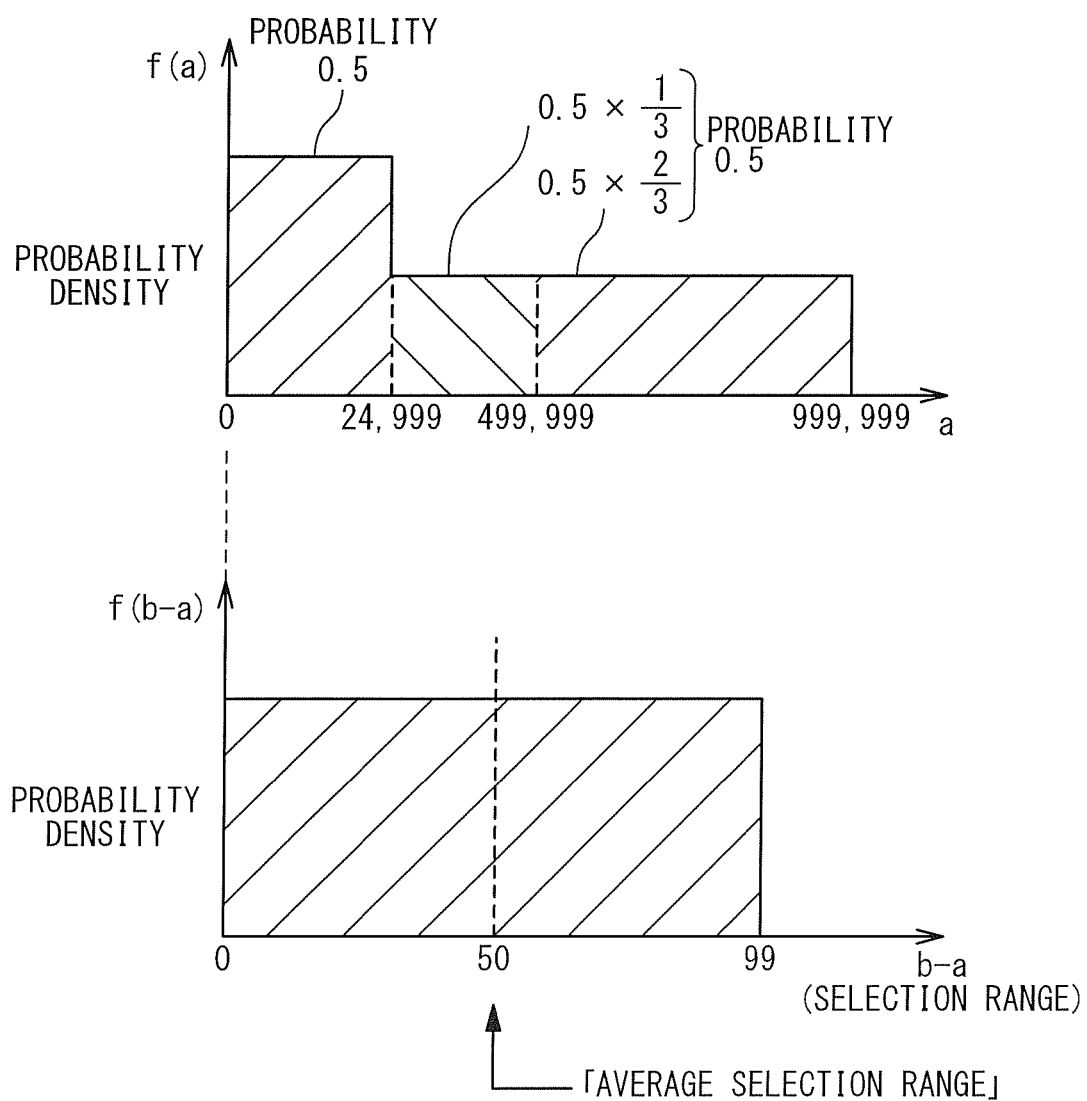
FIG. 10 is a conceptual view explaining a second processing example.

FIG. 10 conceptually shows the variable distribution information D4 in this example. In this example, the variable distribution information D4 indicates that (1) the probability at which the condition variable a has the value in the range of 0 to 249,999 is 0.5 and its probability distribution is uniform, (2) the probability at which the condition variable a has the value in the range of 250,000 to 999,999 is 0.5 and its probability distribution is uniform, and (3) the value range (selection range) (b-a) has the value in the range of 0 to 99 with the uniform probability. Similarly to the case of the first processing example, the average value of the value ranges (b-a), namely, the "average selection range" is 50.

Figure 11:
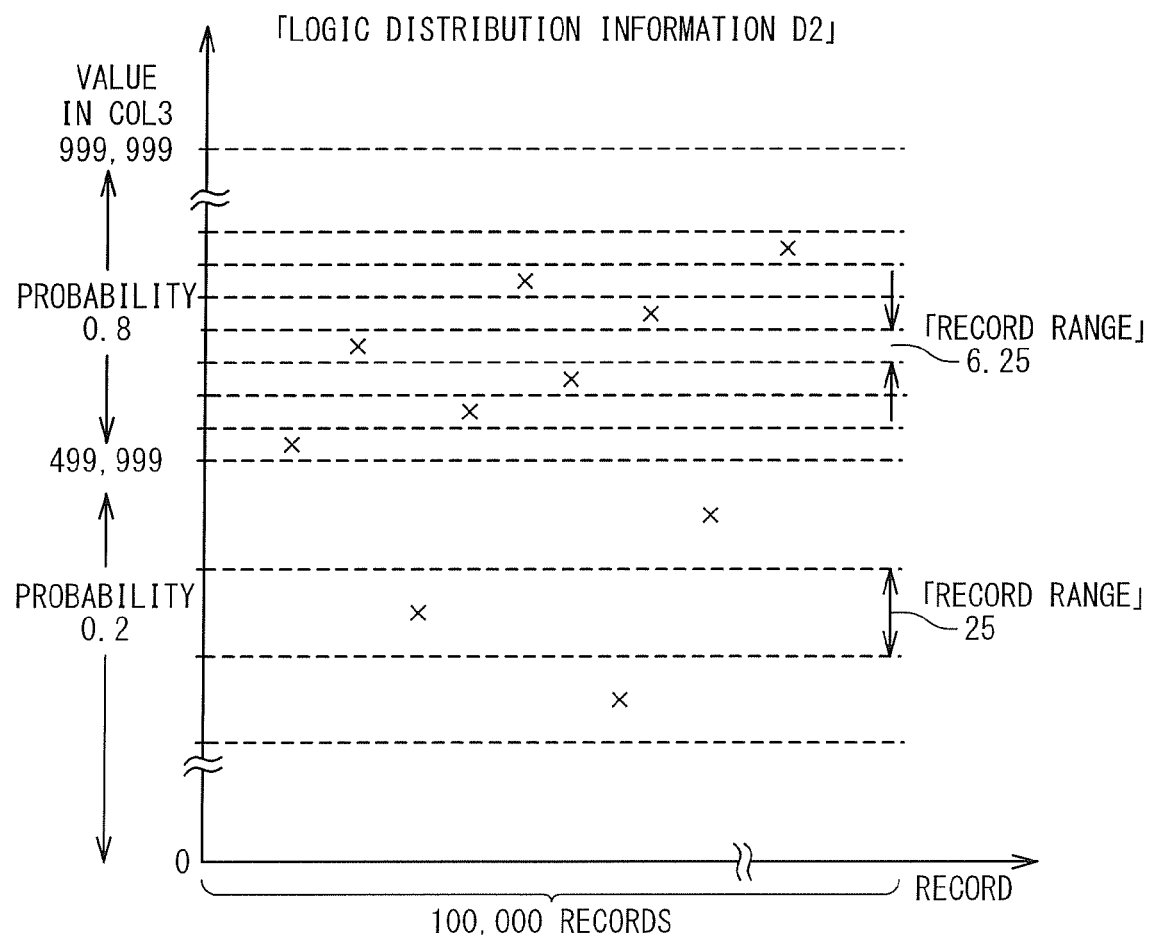
FIG. 11 is a conceptual view explaining the second processing example.

FIG. 11 conceptually shows the logic distribution information D2 in this example. In this example, the logic distribution information D2 indicates that (1) the probability that values of the third column COL3 has the value between 0 and 499,999 is 0.2 and its probability distribution is uniform and (2) the probability that values of the third column COL3 has the value in the range of 500,000 to 999,999 is 0.8 and its probability distribution is uniform. This means that values of the third column of 20,000 records are between 0 and 499,999 and those of 80,000 records are between 500,000 and 999,999. Therefore the record range is 25(=500,000/20,000) when the conditional variable a is less than about 499,999 and is 6.25 (=500,000/80,000) when the variable is more than or equal to 500,000.

At the step S20, the record number calculating module 20 divides the average selection range by the record range and the quotient is the selection record number. As shown in FIG. 10, the probability at which the condition variable a has the value in the range of 0 to 249,999 is 0.5, and the selection record number in that case is calculated as "0.5×(50/25)=1". Similarly, the probability at which the condition variable a has the value in the range of 250,000 to 499,999 is 0.5/3, and the selection record number in that case is calculated as "0.5/3×(50/25)=1/3". The probability at which the condition variable a has the value in the range of 500,000 to 999,999 is 0.5×2/3, and the selection record number in that case is calculated as "0.5×2/3×(50/6.25)=8/3". Thus, the total of the selection record numbers is "4 (=1+1/3+8/3)". In short, the record number calculating module 20 estimates that the four records are averagely read out from the table SAMPLE in response to the query.

The process after that is the same as that in the first processing example. FIG. 12 shows the block access number information D10 in this example. In this example, the block access number in the case of the index scan is estimated as "the total of six times".

1-4. Third Processing Example

Still another processing example will be described below. In the third processing example, the record arrangement information D5 indicates the "sequential arrangement" in which the respective records in the table SAMPLE are sequentially arranged in the value order of the third column COL3. The input information other than the record arrangement information D5 is the same as that in the first processing example. Thus, at the step S20, the record number calculating module 20 calculates the selection record number at "5". At the step S30, the result of the calculating process (Step S33) for the block access number in the case of the index scan differs from that of the first processing example.

Figure 13:
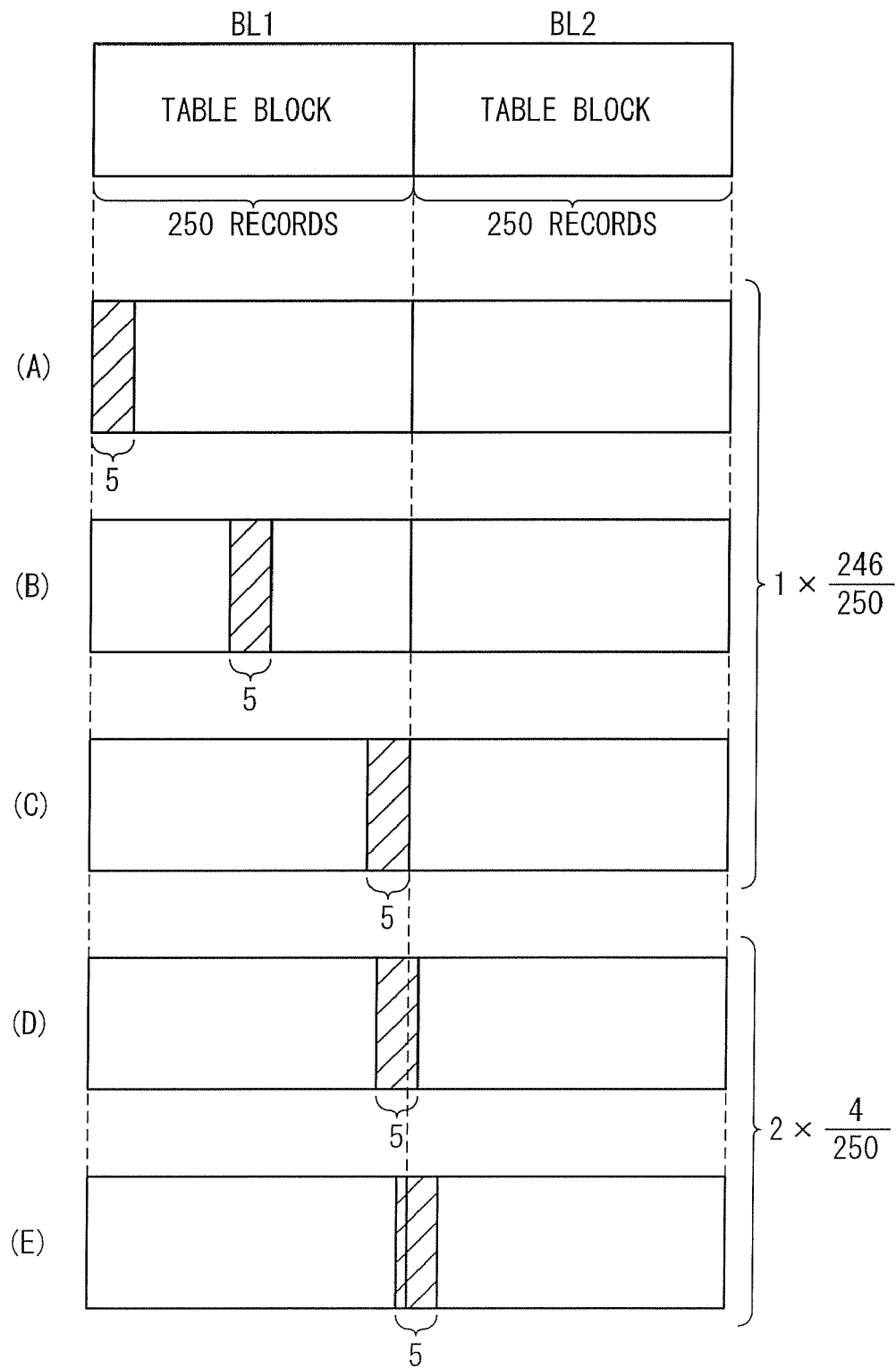
FIG. 13 is a conceptual view explaining a third processing example.

In the case of the random arrangement, it is estimated that the five records of the reading target are arranged in the table blocks BL different from each other. Thus, the number of the accesses to the table blocks BL is estimated to be five which is equal to the selection record number. On the other hand, in the case of the sequential arrangement, the five records are consecutively arranged. Hence, the number of accesses to the table blocks BL is expected to be smaller. FIG. 13 shows the various arrangement examples of the five records in this example. FIG. 13 shows the two table blocks BL1, BL2. As mentioned above, each table block has the storage region corresponding to the 250 records (refer to FIG. 5). In FIG. 13, the five records are stored consecutively in different positions of a block. When records are stored as shown in (A), (B), and (C) in FIG. 13, one table block is accessed. When records are stored as shown in (D) and (E), two table blocks are accessed.

As is evident from FIG. 13, there are the 246 kinds of the patterns in which the number of the accesses to the table blocks BL is 1, and there are the 4 kinds of the patterns in which the foregoing number is 2. Thus, the "average value (expectation value)" of the number of the accesses to the table blocks BL is calculated as "1.016" from the equation: 1×246/250+2×4/250.

The generalized representation of the foregoing equation is as follows. Here, the total number of the records (250) per table block BL is assumed to be "A1". Also, the selection record number (5) is assumed to be "A2". Moreover, the average value (1.016) of the numbers of the accesses to the table blocks BL is assumed to be "A3". In this case, the foregoing equation is represented by A3=1×(A1−(A2−1))/A1+2×(A2−1)/A1. When this equation is assembled, the following equation is obtained.

$$A3=1+(A2-1)/A1$$

The block access number calculating module 30 calculates the expectation value A3 of the number of the accesses to the table blocks BL, based on the foregoing equation. Moreover, the block access number calculating module 30 adds the number of the accesses to the block, which stores the metadata, to the calculated expectation value A3. The value 3.016 (=1.016+2) obtained is the block access number in the case of an index scan. The other processes are the same as those in the first processing example. FIG. 14 shows the block access number information D10 in this example.

1-5. Fourth Processing Example

Still another processing example will be described below. In the fourth processing example, the record arrangement information D5 specifies both of the "random arrangement" and "sequential arrangement". The input information other than them is the same as that in the first processing example. In this example, the block access numbers in both cases of the random and sequential arrangements are calculated. FIG. 15 shows the block access number information D10 in this example. The block access number when the index scan is executed becomes maximal when records are randomly arranged and becomes minimal when records are sequentially arranged.

1-6. Fifth Processing Example

Still another processing example will be described below. In the fifth processing example, the record arrangement information D5 (not shown) indicates the parameter P representing the degree of the "random arrangement" and the degree of the "sequential arrangement". This parameter P is the parameter for compensating the access number A3 to the table blocks BL. The access number A3 in the case of the random arrangement is defined as MAX, and the access number A3 (1.016) in the case of the sequential arrangement is defined as MIN. In this example, the access number A3 is calculated by the equation: MIN+(MAX−MIN)×P. Here, the "P" is more than or equal to 0 and less than or equal to 1.

1-7. Effect

As mentioned above, according to this exemplary embodiment, it is possible to estimate the block access number (the number of block accesses) for a query even when actual values in a table are not given. We note that a load by fetching greatly depends on the block access number.

The actual values in a table usually cannot be known before building the computer system. If a load by fetching exceeds a suitable value, a computer system must be re-built. According to this exemplary embodiment, such situation can be avoided by estimating the block access number and load by fetching in advance.

This exemplary embodiment is effective also when the database is very large. When the database is very large, it takes very long time to measure the block access number with reference to the actual table. According to this exemplary embodiment, it is possible to estimate the block access number easily in a short time.

The block access number is much different depending on queries. Applying the process according to this exemplary embodiment to queries, it is possible to specify queries which consume a large amount of the computer resources and cause inadequate performance. A designer can change the design specification (for example, the metadata structure) of the database so as to reduce a load by specified queries. Also, according to this exemplary embodiment, the block access number is estimated and outputted for each query execution plan. Consequently, the block access numbers of the plans can be compared before building or changing a system.

2. Second Exemplary Embodiment

In the second exemplary embodiment of the present invention, a load of processing a query and processing performance of the computer system are further estimated from the block access number estimated in the first exemplary embodiment. The same symbols are given to the configuration similar to those in the first exemplary embodiment, and duplicate explanations will be omitted.

2-1. Configuration

Figure 16:
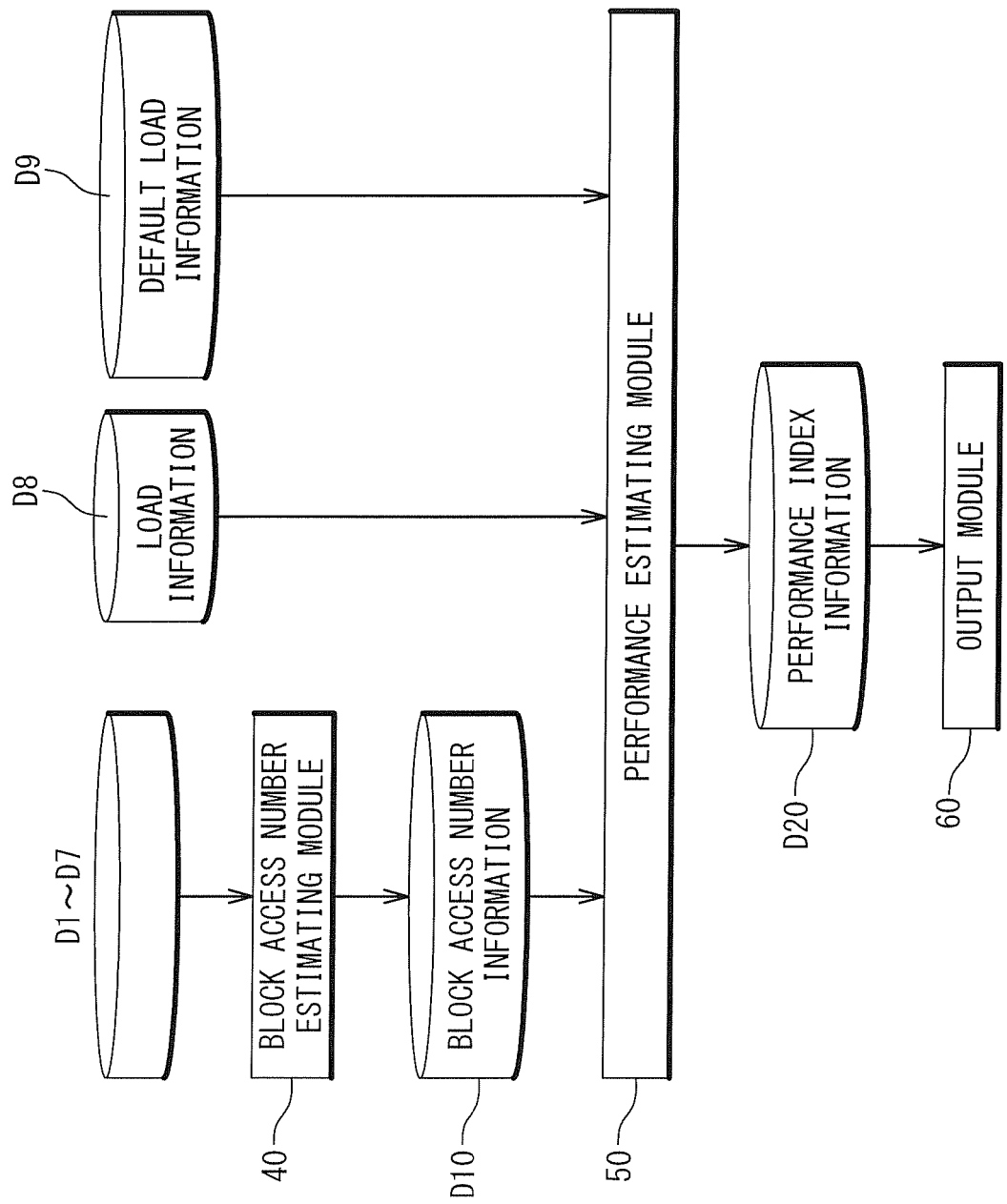
FIG. 16 is a block diagram showing a configuration of a load estimating system according to a second exemplary embodiment of the present invention.

FIG. 16 is a block diagram showing the configuration of the load estimating system according to the second exemplary embodiment. The load estimating system according to the second exemplary embodiment includes a performance estimating module 50, in addition to the configuration in the first exemplary embodiment. The block access number information D10 and load information D8 are inputted as the input information to the performance estimating module 50. Depending on the case, default load information D9 is used as the input information.

FIG. 17 shows one example of the load information D8. The load information D8 indicates a computer load required to access (fetch) one block and a computer load necessary for the other processes. The computer load is given as, for example, a CPU time. For example, in FIG. 17, the load information D8 indicates that (1) the CPU time per block access is 0.001 ms (millisecond). and (2) the CPU time necessary for the other processes is 0.1 ms. This load information D8 obtained from, for example, the design specification and/or information measured in the computer system under the operation. Also, this load information D8 is stored in a predetermined storage unit.

The default load information D9 indicates the default setting of the computer load. When the load information D8 is not given, the default load information D9 is used as the load information D8.

2-2. Processing example

Figure 18:
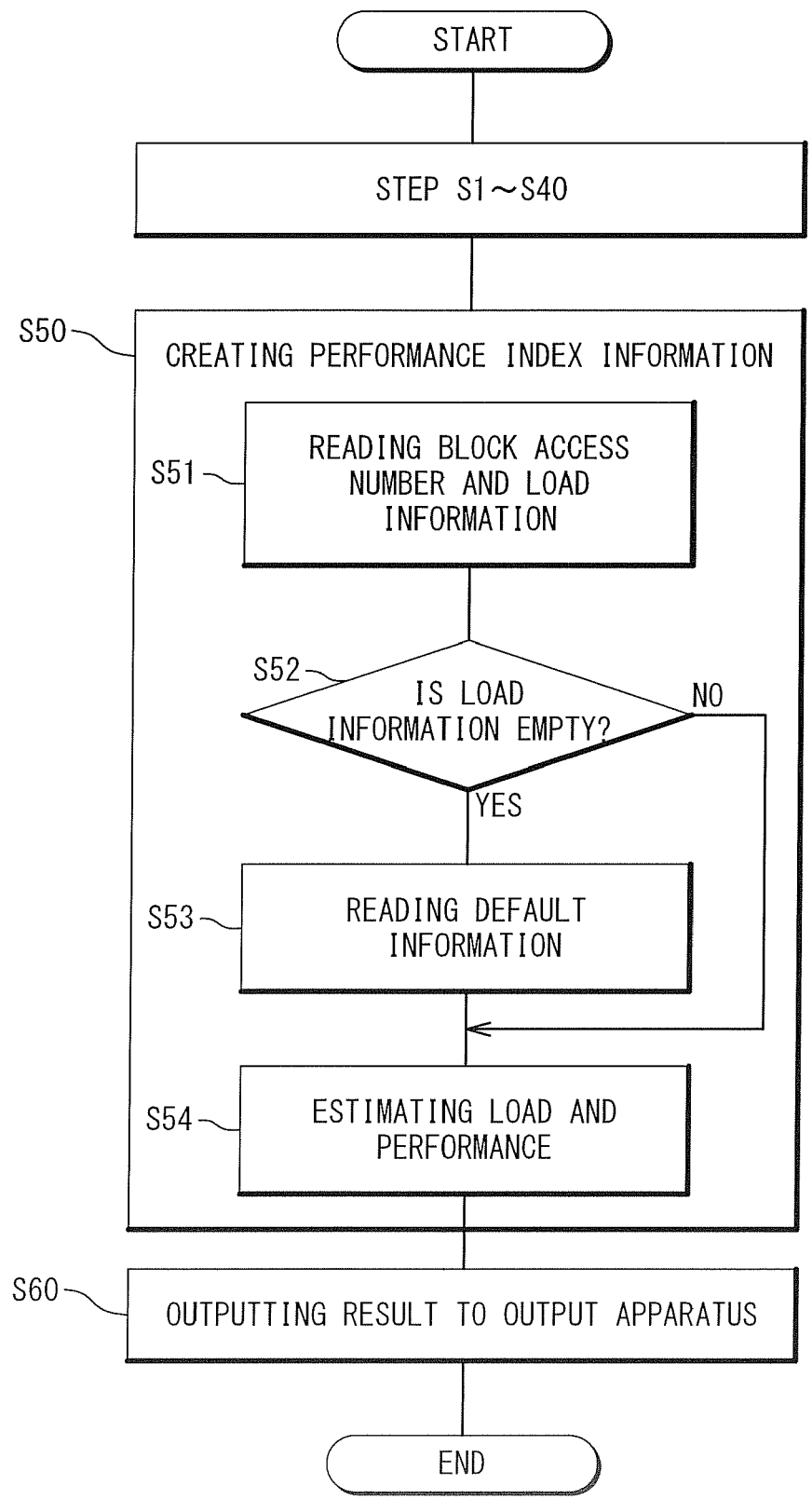
FIG. 18 is a flowchart showing a computer load estimating method according to the second exemplary embodiment.

FIG. 18 is a flowchart showing the process executed by the load estimating system according to this exemplary embodiment. An example of the process in this exemplary embodiment will be described below with reference to FIGS. 16 to 18. The load information D8 is assumed to be that shown in FIG. 17.

Steps S1 to S40:
At first, similarly to the first exemplary embodiment, the block access number estimating module 40 creates the block access number information D10 based on the input information D1 to D6. The created block access number information D10 is assumed to be the same as that in, for example, the first processing example (refer to FIG. 9). Of course, this may be the block access number information created in another processing example.

Step S50:

Next, as shown in FIG. 16, the performance estimating module 50 reads the block access number information D10 and the load information D8 from the storage unit (Step S51). If the load information D8 is empty (Step S52; Yes), the default load information D9 is read (Step S53). In this example, the load information D8 is given (Step S52; No) and goes to a step S54.

Step S54:

The performance estimating module 50 multiplies the block access number indicated in the block access number information D10 by the CPU time per block access indicated in the load information D8. The value calculated by the multiplication corresponds to the CPU time by fetching. Moreover, the performance estimating module 50 adds the CPU time necessary for the other processes indicated in the load information D8 to the calculated CPU time by fetching. The value calculated by the addition corresponds to the CPU time necessary for one query process. Also, the performance estimating module 50 calculates the processing performance (for example, throughput) of the computer system, based on the calculated CPU time.

For example, in the case of the full scan, the block access number is "400". Thus, the CPU time by fetching is calculated as 0.4 ms (=0.001 ms×400). The CPU time of the query process is calculated as 0.5 ms (=0.4 ms+0.1 ms). The throughput is calculated as 2,000 tps (=1000/0.5 ms).

Also, when the execution plan is the index scan, the block access number is "7". Thus, the CPU time by fetching is calculated as 0.007 ms (=0.001 ms×7). The CPU time of the query process is calculated as 0.107 ms (=0.007 ms+0.1 ms). The throughput is calculated as 9,345 tps (=1000/0.107 ms).

In this way, the performance estimating module 50 calculates the CPU time (the load) necessary for the query process and the throughput of the query process, based on the block access number information D10 and the load information D8. The calculated CPU time and throughput serve as the "performance index" of the computer system. The performance estimating module 50 creates a performance index information D20 indicating the created performance index. FIG. 19 shows the performance index information D20 in this example. In FIG. 19, the performance index information D20 indicates the block access number, the CPU time and the throughput for each execution plan. Also, the performance index information D20 indicates that the optimal execution plan is an index scan.

Step S60: Output

The output module 60 outputs the performance index information D20 to the output apparatus, such as a display and a printer. The foregoing processing flow is executed for each query. As a result, the block access number and the performance index are obtained for many queries scheduled to be used.

2-3. Effect

According to this exemplary embodiment, the effect similar to that of the first exemplary embodiment is obtained. Moreover, it is possible to estimate a load of query processes and a performance index of the computer system.

3. Load Estimating System

Figure 20:
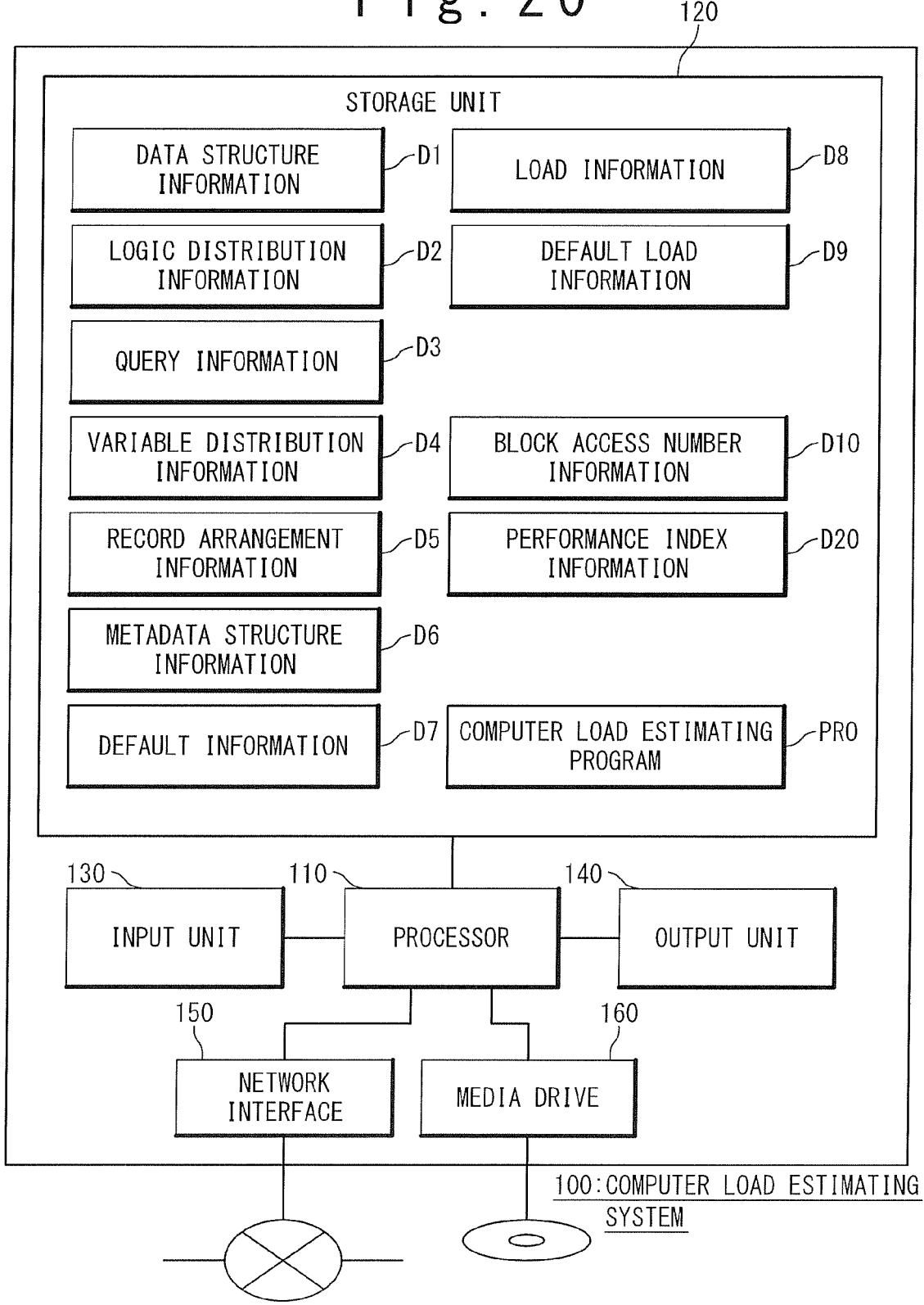
FIG. 20 is a block diagram showing a configuration of a load estimating system according to an exemplary embodiment of the present invention.

The load estimating system as mentioned above is attained by the computer system. FIG. 20 shows one example of a configuration of a load estimating system 100. The load estimating system 100 includes a processor 110, a storage unit 120, an input unit 130, an output unit 140, a network interface 150 and a media drive 160. The processor 110 includes the CPU and carries out the various processes. As the storage unit 120, a RAM and a hard disc are exemplified. As the input unit 130, a keyboard and a mouth are exemplified. As the output unit 140, a display and a printer are exemplified.

The storage unit 120 stores the data structure information D1, the logic distribution information D2, the query information D3, the variable distribution information D4, the record arrangement information D5, the metadata structure information D6, the default information D7, the load information D8 and the default load information D9. The information D1 to D9 may be inputted by the input unit 130 or may be provided through the network interface 150. Also, the storage unit 120 stores the block access number information D10 and the performance index information D20, which are created through the processing flow according to this exemplary embodiment.

The storage unit 120 further stores a computer load estimating program PRO. This computer load estimating program PRO is the software executed by the processor 110. The computer load estimating program PRO is recorded in, for example, a computer readable recording medium, and this is read by the media drive 160.

The processor 110 executes the computer load estimating program PRO and consequently attains the processes according to the present invention. In short, the linkage action between the processor 110 and the computer load estimating program PRO provides the query analyzing module 10, the record number calculating module 20, the block access number calculating module 30, the block access number estimating module 40, the performance estimating module 50 and the output module 60. Each module reads the necessary information from the storage unit 120 and attains the foregoing processes. The output module 60 outputs the prepared block access number information D10 and performance barometer information D20 to the output unit 140. In this way, the processes according to the present invention are attained.

According to the present invention, it is possible to estimate a block access number for a query process.

It is apparent that the present invention is not limited to the above exemplary embodiment, but may be modified and changed without departing from the scope and spirit of the invention.

What is claimed is:

1. A load estimating system which estimates a load of a database, comprising:
a storage unit configured to include structure information defining a structure of a table in said database, first distribution information indicating probability distribution of condition variables of a query for said table, and second distribution information indicating probability distribution of values in said table;
a record number calculating module configured to calculate the average number of selected records which meet conditions defined by condition variables, based on said structure information, said first distribution information and said second distribution information; and an access number calculating module configured to calculate the number of block accesses for said query based on the average number of selected records wherein said condition variables define value ranges, wherein said first distribution information indicates probability distribution of said value ranges, wherein said record number calculating module calculates an average selection range which is an average value of said value ranges, based on said first distribution information, wherein said record number calculating module calculates a record range which is an average value of value ranges taken by said values per record, based on the total number of a plurality of records and said second distribution information, and wherein said record number calculating module calculates the average number of selected records by dividing said average selection range by said record range.

2. The load estimating system according to claim 1, wherein said structure information indicates the total number of said plurality of records in said table and a size of each of said plurality of said records.

3. The load estimating system according to claim 2, wherein said access number calculating module calculates the total number of blocks required to store all of said plurality of records as the number of block accesses based on the total number of said plurality of records, said size of each of said plurality of records and a size of one block, in a full scan.

4. The load estimating system according to claim 1, wherein said storage unit further includes arrangement information indicating a method of arranging said plurality of records into said block and metadata structure information defining a structure of metadata used for an index scan, and said access number calculating module calculates the number of block accesses based on the average number of selected records, said arrangement information and said metadata structure information.

5. The load estimating system according to claim 4, wherein said arrangement information indicates that said plurality of records is randomly arranged independently of said values, said access number calculating module calculates the sum of the average number of selected records and the number of accesses to a block where said metadata is stored as the number of block accesses.

6. The load estimating system according to claim 4, wherein said arrangement information indicates that said plurality of records is sequentially arranged in a value order of said values, when the number of records stored in one block is $A1$ and the average number of selected records is $A2$, said access number calculating module calculates a value $A3$ based on an equation of $A3=1+(A2-1)/A1$, and further calculates the sum of said value $A3$ and the number of accesses to a block where said metadata is stored as the number of block accesses.

7. The load estimating system according to claim 4, wherein said access number calculating module calculates the total number of blocks required to store all of said plurality of records as the number of block accesses based on the total number of said plurality of records, said size of each of said plurality of records and a size of one block, in a full scan.

8. The load estimating system according to claim 7, wherein said arrangement information indicates that said plurality of records is randomly arranged independently of said values, said access number calculating module calculates the sum of the average number of selected records and the number of accesses to a block where said metadata is stored as the number of block accesses.

9. The load estimating system according to claim 7, wherein said arrangement information indicates that said plurality of records is sequentially arranged in a value order of said values, when the number of records stored in one block is $A1$ and the average number of selected records is $A2$, said access number calculating module calculates a value $A3$ based on an equation of $A3=1+(A2-1)/A1$, and further calculates the sum of said value $A3$ and the number of accesses to a block where said metadata is stored as the number of block accesses.

10. The load estimating system according to claim 1, further comprising:

a display device configured to display the number of block accesses.

11. The load estimating system according to claim 1, further comprising:

a performance estimating module, wherein said storage unit further includes load information indicating a computer load required to access one block, wherein said performance estimating module calculates a load necessary for a process of said query, based on said computer load and the number of block accesses.

12. The load estimating system according to claim 11, further comprising:

a display device configured to display said load necessary for the process of said query.

13. A method of estimating a computer load, which estimates a load of a database, comprising:

reading structure information defining a structure of a table in said database from a storage unit;

reading first distribution information indicating probability distribution of condition variables of a query for said table from said storage unit;

reading second distribution information indicating probability distribution of values in said table from said storage unit;

calculating the average number of selected records which meet conditions defined by condition variables, based on said structure information, said first distribution information and said second distribution information; and calculating the number of block accesses for said query based on the average number of selected records wherein said structure information indicates the total number of a plurality of records in said table and a size of each of said plurality of said records, wherein said condition variables define value ranges, wherein said first distribution information indicates probability distribution of said vale ranges, wherein said step of calculating the average number of selected records, includes:

calculating an average selection range which is an average value of said value ranges, based on said first distribution information, calculating a record range which is an average value of value ranges taken by said values per record, based on the total number of said plurality of records and said second distribution information, and calculating the average number of selected records by dividing said average selection range by said record range.

14. The method of estimating a computer load according to claim 13, wherein said step of calculating the number of block accesses, includes:
- reading out arrangement information indicating a method of arranging said plurality of records into said block and metadata structure information defining a structure of metadata used for an index scan from said storage unit, and
- calculating the number of block accesses based on the average number of selected records, said arrangement information and said metadata structure information.

15. A computer program product for a method of estimating a computer load, which estimates a load of a database, embodied on a computer-readable medium and comprising code that, when executed, causes a computer to perform the following:
- reading structure information defining a structure of a table in said database from a storage unit;
- reading first distribution information indicating probability distribution of condition variables of a query for said table from said storage unit;
- reading second distribution information indicating probability distribution of values in said table from said storage unit;
- calculating the average number of selected records which meet conditions defined by condition variables, based on said structure information, based on said structure information, said first distribution information and said second distribution information; and
- calculating the number of block accesses for said query based on the average number of selected records wherein said structure information indicates the total number of a plurality of records in said table and a size of each of said plurality of said records, wherein said condition variables define vale ranges, wherein said first distribution information indicates probability distribution of said value ranges, wherein said step of calculating the average number of selected records, includes:
- calculating an average selection range which is an average value of said value ranges, based on said first distribution information,
- calculating a record range which is an average value of value ranges taken by said values per record, based on the total number of said plurality of records and said second distribution information, and
- calculating the average number of selected records by dividing said average selection range by said record range.

16. The computer program product according to claim 15, wherein said step of calculating the number of block accesses, includes:
- reading out arrangement information indicating a method of arranging said plurality of records into said block and metadata structure information defining a structure of metadata used for an index scan from said storage unit, and
- calculating the number of block accesses based on the average number of selected records, said arrangement information and said metadata structure information.

* * * * *